US008902842B1

(12) United States Patent
Gomadam et al.

(10) Patent No.: US 8,902,842 B1
(45) Date of Patent: Dec. 2, 2014

(54) CONTROL SIGNALING AND RESOURCE MAPPING FOR COORDINATED TRANSMISSION

(71) Applicant: Marvell International Ltd., Hamilton (BM)

(72) Inventors: Krishna Srikanth Gomadam, San Jose, CA (US); Jihwan P. Choi, Daegu (KR); Yakun Sun, Sunnyvale, CA (US)

(73) Assignee: Marvell International Ltd, Hamilton (BM)

( * ) Notice: Subject to any disclaimer, the term of this patent is extended or adjusted under 35 U.S.C. 154(b) by 81 days.

(21) Appl. No.: 13/736,959

(22) Filed: Jan. 9, 2013

Related U.S. Application Data

(60) Provisional application No. 61/585,556, filed on Jan. 11, 2012.

(51) Int. Cl.
*H04W 4/00* (2009.01)
*H04W 72/04* (2009.01)

(52) U.S. Cl.
CPC ................................. *H04W 72/04* (2013.01)
USPC ........... 370/329; 370/255; 370/254; 370/341; 370/330; 370/338

(58) Field of Classification Search
CPC ............................. H04W 24/00; H04W 72/00
USPC .................. 370/329, 255, 254, 341, 330, 338
See application file for complete search history.

(56) References Cited

U.S. PATENT DOCUMENTS

| 5,231,629 A | 7/1993 | Kotzin et al. |
| 5,263,160 A | 11/1993 | Porter, Jr. et al. |
| 5,349,567 A | 9/1994 | Reed |
| 5,940,439 A | 8/1999 | Kleider et al. |
| 6,466,904 B1 | 10/2002 | Gao et al. |
| 6,512,750 B1 | 1/2003 | Palenius |
| 6,757,319 B1 | 6/2004 | Parsa et al. |
| 6,865,237 B1 | 3/2005 | Boariu et al. |
| 7,839,944 B2 | 11/2010 | Lee et al. |

(Continued)

FOREIGN PATENT DOCUMENTS

| EP | 2182754 A1 | 5/2010 |
| JP | 2008236222 A | 2/2008 |

(Continued)

OTHER PUBLICATIONS

U.S. Appl. No. 12/965,878 Office Action dated Oct. 24, 2013.

(Continued)

*Primary Examiner* — David Q Nguyen

(57) ABSTRACT

A method includes receiving in a mobile communication terminal signals from a group of cells that cooperate in a Coordinated Multipoint (CoMP) transmission scheme. Signaling information is received from a first cell in the group. The signaling information is indicative of a first pattern of time-frequency Resource Elements (REs) used by the first cell for transmitting reference signals, and is further indicative of a second pattern of the REs used by a second cell in the group for transmitting the reference signals. A third pattern of the REs, which are available for receiving data from the cells, is derived in the terminal from the signaling information that is indicative of the first and second patterns. The data from the cells is received in the terminal in one or more of the REs in the third pattern.

20 Claims, 3 Drawing Sheets

(56) References Cited

U.S. PATENT DOCUMENTS

| | | | |
|---|---|---|---|
| 7,941,186 B2 | 5/2011 | Cho et al. | |
| 8,036,286 B2 | 10/2011 | Lee et al. | |
| 8,068,555 B2 | 11/2011 | Jongren et al. | |
| 8,098,750 B2 | 1/2012 | Mueck et al. | |
| 8,179,775 B2 | 5/2012 | Chen et al. | |
| 8,208,434 B2* | 6/2012 | Sayana et al. | 370/329 |
| 8,325,844 B2 | 12/2012 | Walton et al. | |
| 8,619,693 B2* | 12/2013 | Noh et al. | 370/329 |
| 2002/0001333 A1 | 1/2002 | Glasheen et al. | |
| 2003/0035491 A1 | 2/2003 | Walton et al. | |
| 2005/0108281 A1 | 5/2005 | Kim et al. | |
| 2005/0141630 A1 | 6/2005 | Catreaux et al. | |
| 2005/0157810 A1 | 7/2005 | Raleigh et al. | |
| 2005/0237920 A1 | 10/2005 | Howard et al. | |
| 2005/0250544 A1 | 11/2005 | Grant et al. | |
| 2005/0276317 A1 | 12/2005 | Jeong et al. | |
| 2006/0014554 A1 | 1/2006 | Gerlach | |
| 2006/0056538 A1 | 3/2006 | Nam et al. | |
| 2006/0093060 A1 | 5/2006 | Jung et al. | |
| 2006/0114858 A1 | 6/2006 | Walton et al. | |
| 2006/0153112 A1 | 7/2006 | Lim et al. | |
| 2006/0203777 A1 | 9/2006 | Kim et al. | |
| 2006/0233131 A1 | 10/2006 | Gore et al. | |
| 2006/0276212 A1 | 12/2006 | Sampath et al. | |
| 2007/0058746 A1 | 3/2007 | Gueguen | |
| 2007/0076810 A1 | 4/2007 | Herrera et al. | |
| 2007/0099578 A1 | 5/2007 | Adeney et al. | |
| 2007/0149229 A1 | 6/2007 | Frederiksen et al. | |
| 2007/0153731 A1 | 7/2007 | Fine | |
| 2007/0160162 A1 | 7/2007 | Kim et al. | |
| 2007/0165738 A1 | 7/2007 | Barriac et al. | |
| 2007/0217540 A1 | 9/2007 | Onggosanusi et al. | |
| 2007/0223422 A1 | 9/2007 | Kim et al. | |
| 2007/0223423 A1 | 9/2007 | Kim et al. | |
| 2007/0230373 A1 | 10/2007 | Li et al. | |
| 2007/0248068 A1 | 10/2007 | Onggosanusi et al. | |
| 2007/0253386 A1 | 11/2007 | Li et al. | |
| 2007/0270170 A1 | 11/2007 | Yoon et al. | |
| 2008/0013610 A1 | 1/2008 | Varadarajan et al. | |
| 2008/0025336 A1 | 1/2008 | Cho et al. | |
| 2008/0039067 A1 | 2/2008 | Jin et al. | |
| 2008/0043702 A1 | 2/2008 | Moon et al. | |
| 2008/0049709 A1 | 2/2008 | Pan et al. | |
| 2008/0080364 A1 | 4/2008 | Barak et al. | |
| 2008/0080632 A1 | 4/2008 | Kim et al. | |
| 2008/0080634 A1 | 4/2008 | Kotecha et al. | |
| 2008/0080635 A1 | 4/2008 | Hugl et al. | |
| 2008/0080637 A1 | 4/2008 | Khan et al. | |
| 2008/0095258 A1 | 4/2008 | She et al. | |
| 2008/0101407 A1 | 5/2008 | Khan et al. | |
| 2008/0108310 A1 | 5/2008 | Tong et al. | |
| 2008/0112351 A1 | 5/2008 | Surineni et al. | |
| 2008/0130778 A1 | 6/2008 | Xia et al. | |
| 2008/0144522 A1 | 6/2008 | Chang et al. | |
| 2008/0165875 A1 | 7/2008 | Mundarath et al. | |
| 2008/0186212 A1 | 8/2008 | Clerckx et al. | |
| 2008/0192852 A1 | 8/2008 | Kent et al. | |
| 2008/0198776 A1 | 8/2008 | Seo | |
| 2008/0232494 A1 | 9/2008 | Pan et al. | |
| 2008/0232503 A1 | 9/2008 | Kim | |
| 2008/0247364 A1 | 10/2008 | Kim et al. | |
| 2008/0247475 A1 | 10/2008 | Kim et al. | |
| 2008/0268855 A1 | 10/2008 | Hanuni et al. | |
| 2008/0268887 A1 | 10/2008 | Jansen et al. | |
| 2008/0285433 A1 | 11/2008 | Akita et al. | |
| 2008/0292013 A1 | 11/2008 | Varadarajan et al. | |
| 2008/0298452 A1 | 12/2008 | Sampath et al. | |
| 2008/0298482 A1 | 12/2008 | Rensburg et al. | |
| 2008/0318606 A1 | 12/2008 | Tsutsui et al. | |
| 2009/0011761 A1 | 1/2009 | Han et al. | |
| 2009/0016263 A1 | 1/2009 | Kishigami et al. | |
| 2009/0046800 A1 | 2/2009 | Xu et al. | |
| 2009/0098876 A1 | 4/2009 | Khan et al. | |
| 2009/0110114 A1 | 4/2009 | Onggosanusi et al. | |
| 2009/0122857 A1 | 5/2009 | Li et al. | |
| 2009/0161605 A1 | 6/2009 | Shen et al. | |
| 2009/0180561 A1 | 7/2009 | Kim et al. | |
| 2009/0252332 A1 | 10/2009 | Chang et al. | |
| 2009/0252333 A1 | 10/2009 | Chang et al. | |
| 2009/0282310 A1 | 11/2009 | Seok et al. | |
| 2009/0296844 A1 | 12/2009 | Ihm et al. | |
| 2009/0304109 A1 | 12/2009 | Kotecha | |
| 2010/0031117 A1 | 2/2010 | Lee et al. | |
| 2010/0034308 A1 | 2/2010 | Kim et al. | |
| 2010/0035627 A1 | 2/2010 | Hou et al. | |
| 2010/0054354 A1 | 3/2010 | Tosato | |
| 2010/0056170 A1 | 3/2010 | Lindoff et al. | |
| 2010/0061477 A1 | 3/2010 | Lee et al. | |
| 2010/0067512 A1 | 3/2010 | Nam et al. | |
| 2010/0069106 A1 | 3/2010 | Swarts et al. | |
| 2010/0074301 A1 | 3/2010 | Howard et al. | |
| 2010/0103834 A1 | 4/2010 | Gorokhov et al. | |
| 2010/0158151 A1 | 6/2010 | Krauss et al. | |
| 2010/0172424 A1 | 7/2010 | Perets et al. | |
| 2010/0172430 A1 | 7/2010 | Melzer et al. | |
| 2010/0173639 A1 | 7/2010 | Li et al. | |
| 2010/0215112 A1 | 8/2010 | Tsai et al. | |
| 2010/0220800 A1 | 9/2010 | Erell et al. | |
| 2010/0238984 A1 | 9/2010 | Sayana et al. | |
| 2010/0254474 A1 | 10/2010 | Gomadam et al. | |
| 2010/0260234 A1 | 10/2010 | Thomas et al. | |
| 2010/0260243 A1 | 10/2010 | Ihm et al. | |
| 2010/0267341 A1 | 10/2010 | Bergel et al. | |
| 2010/0271968 A1 | 10/2010 | Liu et al. | |
| 2010/0272014 A1 | 10/2010 | Orlik et al. | |
| 2010/0272032 A1* | 10/2010 | Sayana et al. | 370/329 |
| 2010/0273514 A1 | 10/2010 | Koo et al. | |
| 2010/0278278 A1 | 11/2010 | Lee et al. | |
| 2010/0284484 A1 | 11/2010 | Jongren et al. | |
| 2010/0290548 A1 | 11/2010 | Hoshino et al. | |
| 2010/0296603 A1 | 11/2010 | Lee et al. | |
| 2011/0019631 A1 | 1/2011 | Kotecha et al. | |
| 2011/0026413 A1 | 2/2011 | Swarts et al. | |
| 2011/0034175 A1 | 2/2011 | Fong et al. | |
| 2011/0058621 A1 | 3/2011 | Clerckx et al. | |
| 2011/0064156 A1 | 3/2011 | Kim et al. | |
| 2011/0077038 A1 | 3/2011 | Montojo et al. | |
| 2011/0080969 A1 | 4/2011 | Jongren et al. | |
| 2011/0085610 A1 | 4/2011 | Zhuang et al. | |
| 2011/0096704 A1 | 4/2011 | Erell et al. | |
| 2011/0103534 A1 | 5/2011 | Axmon et al. | |
| 2011/0110403 A1 | 5/2011 | Jongren | |
| 2011/0110450 A1 | 5/2011 | Gomadam et al. | |
| 2011/0150052 A1 | 6/2011 | Erell et al. | |
| 2011/0164701 A1 | 7/2011 | Nikopourdeilami et al. | |
| 2011/0170435 A1 | 7/2011 | Kim et al. | |
| 2011/0170638 A1 | 7/2011 | Yuan et al. | |
| 2011/0188393 A1 | 8/2011 | Mallik et al. | |
| 2011/0194594 A1 | 8/2011 | Noh et al. | |
| 2011/0194638 A1 | 8/2011 | Erell et al. | |
| 2011/0194644 A1 | 8/2011 | Liu et al. | |
| 2011/0205930 A1 | 8/2011 | Rahman et al. | |
| 2011/0216846 A1 | 9/2011 | Lee et al. | |
| 2011/0235608 A1 | 9/2011 | Koo et al. | |
| 2011/0250919 A1 | 10/2011 | Barbieri et al. | |
| 2011/0261775 A1 | 10/2011 | Kim et al. | |
| 2011/0268204 A1 | 11/2011 | Choi et al. | |
| 2011/0274188 A1 | 11/2011 | Sayana et al. | |
| 2011/0306341 A1 | 12/2011 | Klein et al. | |
| 2012/0002568 A1 | 1/2012 | Tiirola et al. | |
| 2012/0020433 A1 | 1/2012 | Bhattad et al. | |
| 2012/0033592 A1 | 2/2012 | Kim et al. | |
| 2012/0033630 A1 | 2/2012 | Chung et al. | |
| 2012/0039216 A1* | 2/2012 | Li et al. | 370/254 |
| 2012/0039369 A1 | 2/2012 | Choi et al. | |
| 2012/0058735 A1 | 3/2012 | Vermani et al. | |
| 2012/0063336 A1 | 3/2012 | Shany et al. | |
| 2012/0069887 A1 | 3/2012 | Park et al. | |
| 2012/0069917 A1 | 3/2012 | Liu et al. | |
| 2012/0076028 A1 | 3/2012 | Ko et al. | |
| 2012/0087425 A1 | 4/2012 | Gomadam et al. | |
| 2012/0087435 A1 | 4/2012 | Gomadam et al. | |
| 2012/0134434 A1 | 5/2012 | Chen et al. | |
| 2012/0219042 A1 | 8/2012 | Onggosanusi et al. | |

(56) References Cited

U.S. PATENT DOCUMENTS

| | | | |
|---|---|---|---|
| 2012/0219083 | A1 | 8/2012 | Tong et al. |
| 2012/0250550 | A1 | 10/2012 | Gomadam et al. |
| 2012/0257664 | A1 | 10/2012 | Yue et al. |
| 2012/0275376 | A1 | 11/2012 | Sampath et al. |
| 2012/0275386 | A1 | 11/2012 | Frenne et al. |
| 2012/0281620 | A1 | 11/2012 | Sampath et al. |
| 2012/0281646 | A1* | 11/2012 | Liao et al. ............. 370/329 |
| 2013/0003604 | A1* | 1/2013 | Blankenship et al. ....... 370/255 |
| 2013/0028068 | A1 | 1/2013 | Park et al. |
| 2013/0028344 | A1 | 1/2013 | Chen et al. |
| 2013/0039284 | A1 | 2/2013 | Marinier et al. |
| 2013/0051256 | A1 | 2/2013 | Ong et al. |
| 2013/0107916 | A1 | 5/2013 | Liu et al. |
| 2013/0114654 | A1 | 5/2013 | Gomadam |
| 2013/0114655 | A1 | 5/2013 | Gomadam |
| 2013/0122953 | A1 | 5/2013 | Zhang et al. |
| 2013/0176991 | A1 | 7/2013 | YI |
| 2013/0182786 | A1 | 7/2013 | Frenne et al. |
| 2014/0092862 | A1* | 4/2014 | Noh et al. ............. 370/330 |

FOREIGN PATENT DOCUMENTS

| | | |
|---|---|---|
| JP | 2008054125 A | 3/2008 |
| JP | 2008118411 A | 5/2008 |
| JP | 2008147792 A | 6/2008 |
| WO | 2005117283 A2 | 12/2005 |
| WO | 2007133564 A3 | 11/2007 |
| WO | 2008009157 A1 | 1/2008 |
| WO | 2008133582 A2 | 11/2008 |
| WO | 2009116471 A1 | 9/2009 |
| WO | 2010013950 A2 | 2/2010 |
| WO | 2011147692 A1 | 12/2011 |

OTHER PUBLICATIONS

U.S. Appl. No. 13/052,075 Notice of Allowance dated Nov. 8, 2013.
JP Patent Application # 2011-551560 Office Action dated Oct. 29, 2013.
JP Patent Application # 2012-506601 Office Action dated Oct. 22, 2013.
U.S. Appl. No. 13/543,835 Office Action dated Nov. 22, 2013.
U.S. Appl. No. 12/965,878 Notice of Allowance dated Feb. 10, 2014.
U.S. Appl. No. 13/669,476 Office Action dated Mar. 31, 2014.
U.S. Appl. No. 14/179,593 Office Action dated Apr. 9, 2014.
U.S. Appl. No. 12/903,237 Office Action dated Feb. 27, 2014.
JP Application # 2012537460 Office Action dated Jan. 21, 2014.
NTT Docomo, 3GPP TSG RAN WG1, "Views on Scalable CSI Feedback for DL CoMP in LTE-Advanced", Meeting #58bis, R1-094243, pp. 1-5, Oct. 12-16, 2009.
NTT Docomo, 3GPP TSG RAN WG1, "Views on Single-Cell CSI Feedback Enhancement for DL MU-MIMO in LTE-Advanced", Meeting #58bis, R1-094241, pp. 1-6, Oct. 12-16, 2009.
U.S. Appl. No. 13/669,477 Official Action dated Apr. 14, 2014.
International Application No. PCT/IB2009/052726 Search Report dated Jan. 28, 2010.
International Application No. PCT/IB2010/050014 Search Report dated Jun. 15, 2010.
International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
QUALCOMM Europe, "Link Analysis for 4×2 and 4×4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009.
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16—2001, IEEE Computer Society and IEE Microwave Theory and Techniques Society, USA, Oct. 1, 2004.
NTT Docomo et al., "Prioritized Deployment Scenarios for LTE-Advanced Studies", 3GPP TSG RAN WG4 Meeting #50, Athens, Greece, Feb. 9-13, 2009.
Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
QUALCOMM Europe, "Downlink RS Structure in Support of Higher-Order MIMO", 3GPP TSG RAN WG1 Meeting #57, San Francisco, USA, May 4-8, 2009.
"Ran1 Chairman Notes", 3GPP TSG RAN WG1 Meeting #55bis, Ljubljana, Slovenia, Jan. 12-16, 2009.
Marvell Semiconductor, "Number of Codewords for 8×8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.
3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.
ETSI TS 136213, "LTE; Evolved Universal Terrestrial Radio Access (E-UTRA), Physical Layer Procedures", V10.2.0, Jun. 2011.
3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.

(56) References Cited

OTHER PUBLICATIONS

Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit-Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
U.S. Appl. No. 61/111,475, filed Nov. 5, 2008.
Research in Motion, UK Limited, "Uplink Power Control for Carrier Aggregation", 3GPP TSG RAN WG1 Meeting # 57b, Lon Angeles, USA, Jun. 29-Jul. 3, 2009.
Nokia Siemens Networks, "PUSCH Power Control for LTE-Advanced", 3GPP TSG RAN WG1 Meeting # 57bis, Los Angeles, USA, Jun. 29-Jul. 3, 2009.
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008.
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008.
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009.
QUALCOMM Europe, Notion of Anchor Carrier in LTE-A, 3GPP TSG RAN WG1 Meeting #55-bis, Ljubljana, Slovenia, Jan. 12-16, 2009.
Samsung, "UL Transmission Power Control in LTE-A", 3GPP TSG RAN WG1 Meeting #56bis, Seoul, Korea, Mar. 23-27, 2009.
International Application PCT/IB2010/055763 Search Report dated Jun. 14, 2011.
International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.
Texas Instruments, "Higher CSI feedback accuracy for 4/8Tx Rel.10 DL MIMO", 3GPP TSG RAN WG1 62, Madrid, Spain, Aug. 23-27, 2010.
U.S. Appl. No. 12/477,152 Official Action dated Jun. 26, 2012.
U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.
International Application PCT/IB2012/051511 Search Report dated Aug. 31, 2012.
Gomadam et al., U.S. Appl. No. 13/610,904, filed Sep. 12, 2012.
3GPP TR 36.819 "3rd Generation Partnership Project; Technical Specification Group Radio Access Network; Coordinated Multi-Point Operation for LTE Physical Layer Aspects (release 11)", version 11.0.0, Sep. 2011.
JP Patent Application # 2011-544111 Official Action dated Nov. 6, 2012.
U.S. Appl. No. 13/253,078 Office Action dated May 23, 2013.
Asahi, H., "A Function Generator for Walsh Order Hadamard Matrix and Fast Walsh-Hadamard Transform", Geoinformatics, vol. 11, No. 1, pp. 3-9, year 2000.
Alcatel-Lucent et al., "Way Forward on Enhancement for Rel.10 DL MIMO", 3GPP TSG RAN WG1 62, Madrid, Spain, Aug. 23-27, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG Ran # 64, Taipei, Taiwan, Feb. 21-25, 2011.
ZTE, "Initial CoMP Evaluation for Homogeneous Network with High Tx Power RRHs", 3GPP TSG RAN # 64, Taipei, Taiwan, Feb. 21-25, 2011.
U.S. Appl. No. 12/723,647 Official Action dated Feb. 6, 2012.
U.S. Appl. No. 12/723,647 Official Action dated Apr. 27, 2012.
Zhang et al., U.S. Appl. No. 13/409,130, filed Mar. 1, 2012.
U.S. Appl. No. 12/652,044 Official Action dated Feb. 7, 2012.
Alcatel-Lucent et al., "Way Forward on 8Tx Codebook for Rel.10 DL MIMO", 3GPP TSG RAN WG1 62, Madrid, Spain, Aug. 23-27, 2010.
Huang et al., "A Limited Feedback Precoding System with Hierarchical Codebook and Linear Receiver", IEEE Transactions on Wireless Communications, vol. 7, No. 12, pp. 4843-4848, Dec. 2008.
Kim et al., "Efficient Feedback via Subs pace-Based Channel Quantization for Distributed Cooperative Antenna Systems with Temporarily Correlated Channels", EURASIP Journal on Advances in Signal Processing, vol. 2008, Nov. 23, 2007.
NTT Docomo, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
ZTE, "Link Analysis of 4Tx Codebook Design for DL SU-MIMO", 3GPP TSG-RAN WG1 #48bis, St. Julians, Malta, Mar. 26-30, 2007.
3GPP TS 36.213, "3rd Generation Partnership Project; Technical Specification Group Radio Access Network; Evolved Universal Terrestrial Radio Access (E-UTRA); Physical layer procedures (Release 10)", version 10.3.0., Sep. 2011.
U.S. Appl. No. 12/965,878 Official Action dated Apr. 1, 2013.
U.S. Appl. No. 13/023,555 Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011024295 Office Action dated Jan. 15, 2013.
Gomadam, K.S., U.S. Appl. No. 13/888,385, filed May 7, 2013.
Gomadam et al., U.S. Appl. No. 13/862,422, filed Apr. 14, 2013.
U.S. Appl. No. 13/252,218 Office Action dated Apr. 11, 2013.
Japanese Patent Application # 2011-544111 Office Action dated Mar. 12, 2013.
3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.
Motorola, "Uplink Power Control for E-UTRA", 3GPP TSG RAN1 #48, St. Louis, USA, Feb. 12-16, 2007.
Nortel, "On the discussions of carrier aggregations", 3GPP TSG-RAN Working Group 1 Meeting #55, Prague, Czech Republic, Nov. 10-14, 2008.
NTT Docomo, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.

(56) References Cited

OTHER PUBLICATIONS

Lucent Technologies, "Link Error Prediction for E-DCH", TSG-RAN WG1#35, Lisbon, Portugal, Nov. 17-21, 2003.
Ericsson, "On Channel Reciprocity for Enhanced DL Multi-Antenna Transmission", TSG-RAN WG1 #59, Jeju, Korea, Nov. 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section k4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.
Motorola, "Low-Overhead Feedback of Spatial Covariance Matrix", TSG-RAN WG1 #59, Jeju, Korea, Nov. 9-13, 2009.
Motorola, "Use of UL Covariance for Downlink MIMO in FDD", TSG-RAN WG1 #59, Jeju, Korea, Nov. 9-13, 2009.
3rd Generation Partnership Project, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), Sophia Antipolis, France.
Samsung, "Discussion on Enhanced Dl Beamforming", 3GPP TSG RAN WG1 Meeting #56bis, Seoul, Korea, Mar. 23-27, 2009.
Alcatel-Lucent Shanghai Bell, "Correlation-based Explicit Feedback", 3GPP TSG Ran WG1 Meeting # 59bis, Valencia, Spain, Jan. 18-22, 2010.
International Application PCT/IB2010/051088 Search Report dated Sep. 21, 2010.
International Application PCT/IB2010/053272 Search report dated Dec. 27, 2010.
Motorola, "Codebook for 8Tx DL SU-MIMO for LTE-1", TSG-RAN WG1 #59, Jeju, Korea, Nov. 9-13, 2009.
Marvell Semiconductor, "Precoding Options for 8Tx Antennas in LTE-A DL", 3GPP TSG RAN WG1 Meeting #55bis, Ljubljana, Slovenia, Jan. 12-16, 2009.
Erell, A.,U.S. Appl. No. 13/052,075, filed Mar. 20, 2011.
Marvell, "Codebook Adaptation for ULA Antenna", 3GPP TSG RAN WG1 Meeting #60, San Francisco, USA, Feb. 22-22, 2010.
U.S. Appl. No. 61/321,386, filed Apr. 6, 2010.
U.S. Appl. No. 61/294,737, filed Mar. 13, 2010.
Perets et al., U.S. Appl. No. 12/902,168, filed Oct. 12, 2010.
Mayrench et al., U.S. Appl. No. 12/903,237, filed Oct. 13, 2010.
Alcatel-Lucent, "Fractional Power Control Using Pilot Power Ration Measurements for the E-UTRA Uplink", 3GPP TSG RAN WG1 # 48, St. Louis, USA, Feb. 12-16, 2007.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE-A downlink transmission", 3GPP TSG RAN WG1 Meeting #59, Jeju, Korea, Nov. 9-13, 2009.
Marvell, "Details of PUCCH 1-1 for 8Tx", 3GPP TSG RAN # 63, Jacksonville, USA, Nov. 15-19, 2010.
Gomadam et al., U.S. Appl. No. 13/346,737, filed Jan. 10, 2012.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSG RAN WG1 meeting #58, Shenzhen, China, Aug. 24-28, 2009.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
Marvell, "Successive Codebook Refinement: Further details and evaluation", 3GPP TSG-RAN WG1 #60bis, Beijing, Apr. 12-16, 2010.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009.
Marvell Semiconductor, "Spatial Correlation based transmission schemes for LTE-A DL", 3GPP TSG RAN WG1 meeting #58, Shenzhen, China, Aug. 24-28, 2009.
Samsung, "Comparisons and performance evaluation of differential feedback proposals for Rel 8 PMI enhancements", 3GPP TSG RAN WG1 Meeting #59bis, Valencia, Spain, Jan. 18-22, 2010.
Samsung, "Codebook Design for 8 Tx Transmission in LTE-A", 3GPP TSG RAN WG1 Meeting #56, Athens, Greece, Feb. 9-13, 2009.
International Application PCT/IB2009/052987 Search Report dated Jan. 27, 2010.
Rapporteur (NTT Docomo), "Text Proposal for RAN1 TR on LTE Advanced", 3GPP TSG RAN WG1 Meeting #53bis, Warsaw, Poland, Jun. 30-Jul. 4, 2008.
Ericsson, "Design and Evaluation of Precoder Codebooks for CSI Feedback", 3GPP TSG RAN WG1 61bis, Dresden, Germany, Jun. 28-Jul. 2, 2010.
Samsung, "Coordinated Multi-Point Operation for LTE", TSG RAN WG1 50, Istanbul, Turkey, Dec. 7-10, 2010.
Alcatel-Lucent et al., "Way Forward on CSI Feedback for Rel.10 DL MIMO", 3GPP TSG RAN WG1 62, Madrid, Spain, Aug. 23-27, 2010.
Alcatel-Lucent et al., "Further Analysis of Companion Feedback Performance and Feedback Signaling Overhead Reduction", 3GPP TSG RAN WG1 62, Madrid, Spain, Aug. 23-27, 2010.
Alcatel-Lucent et al., "Way Forward on CQI/PMI Reporting Enhancement on PUSCH 3-1 for 2, 4 and 8 TX", 3GPP TSG RAN WG1 62bis, Xian, China, Oct. 11-15, 2010.
Marvell, "CQI Enhancement for 4Tx", 3GPP TSG-RAN WG1 #62bis, Xian, Oct. 11-15, 2010.
NEC Group, "Enhancing MU-MIMO CQI," 3GPP TSG-RAN WGl #62bis, Xian, China, Oct. 11-15, 2010.
LG Electronics, "Further Discussion on CQI/PMI Enhancement", 3GPP TSG RAN # 62BIS, Xian, China, Oct. 11-15, 2010.
Marvell, "Two-Component PMI Codebook for 8TX", 3GPP TSG RAN # 62 Meeting, Madrid, Spain, Aug. 23-27, 2010.
U.S. Appl. No. 12/902,168 Office Action dated Aug. 5, 2013.
U.S. Appl. No. 12/983,898 Office Action dated Sep. 12, 2013.
U.S. Appl. No. 13/052,075 Office Action dated Jul. 15, 2013.
U.S. Appl. No. 13/766,790 Office Action dated Jul. 22, 2013.
U.S. Appl. No. 12/903,237 Office Action dated Aug. 16, 2013.
International Application PCT/IB2013/052963 Search Report dated Sep. 27, 2013.

* cited by examiner

US 8,902,842 B1

CONTROL SIGNALING AND RESOURCE MAPPING FOR COORDINATED TRANSMISSION

CROSS-REFERENCE TO RELATED APPLICATIONS

This application claims the benefit of U.S. Provisional Patent Application 61/585,556, filed Jan. 11, 2012, whose disclosure is incorporated herein by reference.

FIELD OF THE DISCLOSURE

The present disclosure relates generally to wireless communication, and particularly to methods and systems for signaling in wireless communication systems.

BACKGROUND

In some Multiple-Input Multiple-Output (MIMO) communication systems, multiple cells use Cooperative Multipoint (CoMP) transmission schemes for coordinating downlink MIMO transmissions to User Equipment (UEs). Third Generation Partnership Project (3GPP) Long Term Evolution-Advanced (LTE-A) systems, for example, use or contemplate the use of multiple CoMP modes such as Dynamic Point Selection (DPS), Dynamic Point Blanking (DPB), Cooperative beamforming (CB) and Joint Transmission (JT).

The CoMP modes used in LTE-A are specified, for example, in "3rd Generation Partnership Project; Technical Specification Group Radio Access Network; Coordinated multi-point operation for LTE physical layer aspects (Release 11)," 3GPP TR 36.819, version 11.0.0, September, 2011, which is incorporated herein by reference. When using CoMP, the cooperating cells typically configure their transmissions based on channel feedback provided by the UEs.

The description above is presented as a general overview of related art in this field and should not be construed as an admission that any of the information it contains constitutes prior art against the present patent application.

SUMMARY

An embodiment that is described herein provides a method, including receiving in a mobile communication terminal signals from a group of cells that cooperate in a Coordinated Multipoint (CoMP) transmission scheme. Signaling information is received from a first cell in the group. The signaling information is indicative of a first pattern of time-frequency Resource Elements (REs) used by the first cell for transmitting reference signals, and is further indicative of a second pattern of the REs used by a second cell in the group for transmitting the reference signals. A third pattern of the REs, which are available for receiving data from the cells, is derived in the terminal from the signaling information that is indicative of the first and second patterns. The data from the cells is received in the terminal in one or more of the REs in the third pattern.

In some embodiments, receiving the signaling information includes receiving an indication of a time-frequency shift of the second pattern, and deriving the third pattern includes determining the third pattern based on the shift. In an embodiment, receiving the signaling information includes receiving an indication of a number of symbols used by the second cell for transmitting a control channel prior to the second pattern, and deriving the third pattern includes determining the third pattern based on the indication.

In another embodiment, receiving the signaling information includes receiving an index that enumerates multiple possible combinations of the first and second patterns, and deriving the third pattern includes determining the third pattern based on the index. In yet another embodiment, receiving the signaling information includes receiving a list of the cells in the group, or a measurement list of the cells in a measurement group over which the terminal is to perform signal measurements.

In an example embodiment, deriving the third pattern includes including in the third pattern only the REs that do not belong to any of the first and second patterns. In a disclosed embodiment, deriving the third pattern includes selecting, based on the signaling information, a subset of the REs in which to receive the data from the cells in a given CoMP mode. In some embodiments, receiving the signaling information includes receiving an indication of at least one RE that is to be skipped in deriving the third pattern, and deriving the third pattern includes omitting the at least one RE from the third pattern.

In an embodiment, deriving the third pattern includes omitting from the third pattern the REs of a given symbol upon detecting that the first cell or the second cell transmits one or more of the reference signals in the given symbol. In another embodiment, receiving the signaling information includes receiving one or more of a dynamic signaling and a semi-static signaling.

There is additionally provided, in accordance with an embodiment that is described herein, a communication apparatus including a transceiver and a processor. The transceiver is configured to receive signals from a group of cells that cooperate in a Coordinated Multipoint (CoMP) transmission scheme, and to receive, from a first cell in the group, signaling information which is indicative of a first pattern of time-frequency Resource Elements (REs) used by the first cell for transmitting reference signals, and is further indicative of a second pattern of the REs used by a second cell in the group for transmitting the reference signals. The processor is configured to derive from the signaling information that is indicative of the first and second patterns, signaled by the first cell, a third pattern of the REs that are available for receiving in the transceiver data from the cells, and to control the transceiver to receive the data from the cells over one or more of the REs in the third pattern.

In some embodiments, a mobile communication terminal includes the disclosed communication apparatus. In some embodiments, a chipset for processing signals in a mobile communication terminal includes the disclosed communication apparatus.

The present disclosure will be more fully understood from the following detailed description of the embodiments thereof, taken together with the drawings in which:

DETAILED DESCRIPTION OF EMBODIMENTS

Embodiments that are described herein provide improved methods and systems for signaling in communication systems that use CoMP. In the disclosed embodiments, a group of cooperating cells transmit downlink MIMO signals to mobile communication terminals in multiple time-frequency Resource Elements (REs). In the embodiments described herein, the cells transmit the signals using Orthogonal Frequency Division Multiplexing (OFDM) modulation, in accordance with the LTE or LTE-A specifications, but the disclosed techniques can be used with various other communication protocols.

For a given terminal, one of the cells in the group is defined as an anchor cell (also referred to as primary cell or serving cell) and the other cells are defined as secondary cells. Among other functions, the anchor cell is responsible for transmitting signaling information to the terminal. Typically, each cell transmits reference signals (e.g., Common Reference Signals—CRS) in accordance with a respective periodic pattern of REs in time and frequency. The patterns used for transmitting the RSs may differ from one cell to another. Thus, only the REs that do not belong to any of the patterns are free for transmitting downlink data from the cells to the terminal.

In some embodiments, the anchor cell transmits to the terminal signaling information, which is indicative of the time-frequency RE patterns that are used by the different cells in the group for transmitting reference signals. In other words, the signaling information provided by the anchor cell indicates not only the pattern used by the anchor cell itself, but also the patterns used by the secondary cells. The terminal receives the signaling information, and uses it to identify the REs that are available for receiving downlink data from the cells. The terminal then receives the downlink data using one or more of these identified REs.

The disclosed techniques enable the terminal to identify which REs are available for data reception, by decoding only the signaling of the anchor cell, even when different cells transmit reference signals in different RE patterns (e.g., when different cells use different cell IDs). Several examples of reference-signal patterns and signaling schemes for various CoMP modes are described herein.

Figure 1:
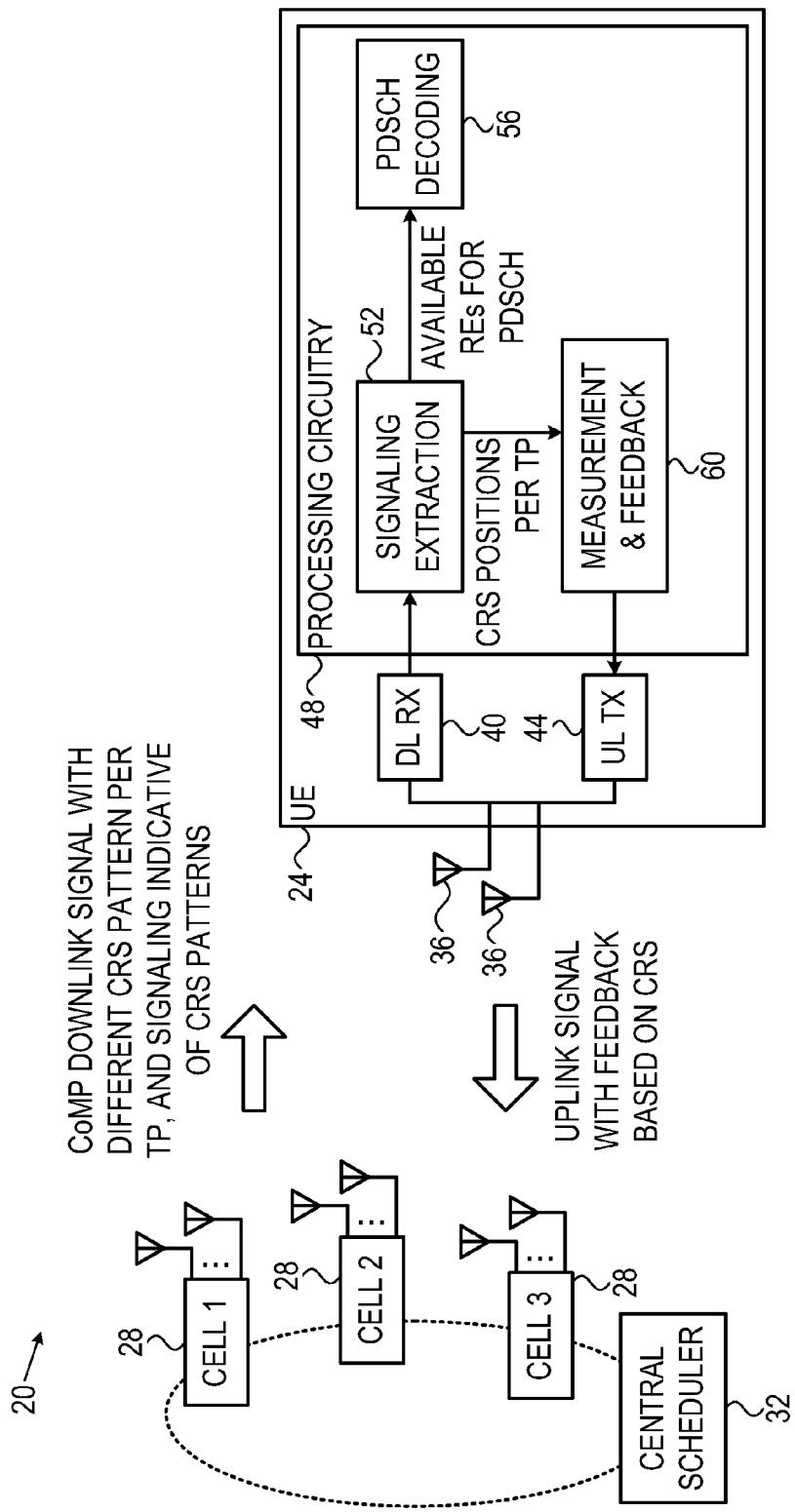
FIG. 1 is a block diagram that schematically illustrates a MIMO communication system that uses CoMP, in accordance with an embodiment that is described herein.

FIG. 1 is a block diagram that schematically illustrates a Cooperative Multipoint (CoMP) communication system 20, in accordance with an embodiment that is described herein. In the present example, system 20 operates in accordance with the Third Generation Partnership Project (3GPP) Long Term Evolution-Advanced (LTE-A) specifications. In alternative embodiments, system 20 may operate in accordance with any other suitable communication protocol in which cells coordinate transmission with one another, such as, for example, WiMAX.

In the embodiment of FIG. 1, system 20 comprises a mobile communication terminal 24 (referred to in LTE-A terminology as User Equipment—UE) and three cells 28 (base stations) denoted CELL1, CELL2 and CELL3. The terms cell, base station, eNodeB and Transmission Point (TP) are used interchangeably herein. The choice of a single UE and three cells is made purely by way of example. In real-life configurations, system 20 typically comprises a large number of cells, some of which may be collocated, and a large number of terminals. Each UE 24 comprises, for example, a cellular phone, a wireless-enabled computing device or any other suitable type of communication terminal.

Cells 28 cooperate with one another in transmitting precoded (i.e., beamformed) signals to UEs 24. Depending on the CoMP mode or on other factors, the cells may cooperate in beamforming, beam activation and deactivation, transmission scheduling or other tasks. A group of cells that cooperate in this manner, such as CELL1, CELL2 and CELL3, is referred to as a cooperating set. In various embodiments, cells 28 may use CoMP modes such as DPS, DPB, JT, CB, and possibly alternate between different modes over time.

In the present embodiment, system 20 comprises a central scheduler 32, which schedules the transmissions of the various cells to the various UEs, and calculates precoding vectors (i.e., sets of complex weights to be applied to the signals transmitted via the respective transmit antennas of the cells) to be applied by the cells when transmitting the CoMP transmissions, in an embodiment.

In some embodiments the central scheduler also selects the appropriate CoMP mode, and the cell or cells in the set that will transmit to a UE. For a given UE 24, one of the cells in the group is typically assigned by scheduler 32 to serve as an anchor cell or primary cell, and the other cells in the group are referred to as secondary cells. Among other functions, the anchor cell is responsible for transmitting signaling information to the UE.

Central scheduler 32 typically selects the CoMP mode, the transmitting cell or cells, and/or the precoding vectors, based on channel feedback that is received from one or more of the UEs. The UE typically calculates the channel feedback by performing signal measurements on reference signals that are transmitted by the cells. In the disclosed embodiments, the time-frequency positions of the reference signals is signaled to the UE using methods that are described in detail below. Using these techniques, the UE is able to identify which REs are occupied by reference signals and which REs are available for receiving data.

Central scheduler 32 is shown in system 20 of FIG. 1 as a separate entity solely by way of example. Alternatively, central scheduler 32 can be implemented as part of a cell or collocated with a cell among the cooperating set (cells 28), for example CELL1. In another embodiment, the function of the central scheduler is carried out in a decentralized fashion, without a single entity controlling the cells within the cooperating set.

In the embodiment of FIG. 1, UE 24 comprises one or more antennas 36, a downlink receiver (DL RX) 40, an uplink transmitter (UL TX) 44, and processing circuitry 48. Receiver 40 receives downlink signals from cells 28 via antennas 36. Processing circuitry 48 processes the received signals. Among other tasks, processing circuitry 48 extracts signaling information that is received from the anchor cell. The signaling information indicates the patterns of REs used by the various cells in the group for transmitting reference signals. From the signaling information, the UE derives the REs that are available for data reception, and uses one or more of these REs to receive data from cells 28.

In the context of the present patent application and in the claims, the term "data" refers to user data that is sent from the cells over data channels, and not to reference signals. In an example embodiment, the data is received in Physical Data Shared Channels (PDSCH), and the reference signals comprise Common Reference Signals (CRS), both specified in the LTE and LTE-A specifications. In alternative embodiments, any other suitable type of data and reference signals can be used.

In the present embodiment, processing circuitry 48 comprises a signaling extraction module 52, which extracts the signaling information from the received downlink signals, and derives the time-frequency locations of the REs occupied by reference signals and the REs available for data reception. A PDSCH decoding module 56 uses the locations of the REs available for data reception for decoding PDSCH in at least one of these REs. A measurement and feedback module 60 uses the locations of the REs occupied by reference signals to measure the channel response over the reference signals in at least one of these REs. Module 60 then calculates feedback information based on the channel measurements, and provides the feedback information to transmitter 44 for transmission to the cells.

The UE configuration seen in FIG. 1 is an example configuration, which is depicted in a highly simplified manner solely for the sake of clarity. In alternative embodiments, any other suitable UE configuration can be used. UE elements that are not mandatory for understanding of the disclosed techniques have been omitted from the figure for the sake of clarity.

In various embodiments, some or all of the elements of UE 24, including receiver 40, transmitter 44 and processing circuitry 48, are implemented in hardware, such as implementing receiver 40 and/or transmitter 44 using one or more Radio Frequency Integrated Circuits (RFICs), or implementing processing circuitry 48 using one or more Field-Programmable Gate Arrays (FPGAs) or Application-Specific Integrated Circuits (ASICs). In alternative embodiments, various elements of UE 24 are implemented in software, or using a combination of hardware and software elements. In some embodiments, some or all of the elements of UE 24 are implemented in a signal-processing chipset.

In some embodiments, various UE elements, such as various elements of processing circuitry 48, are implemented in a programmable processor, which is programmed in software to carry out the functions described herein. The software may be downloaded to the processor, in whole or in part, in electronic form, over a network, for example, or it may, alternatively or additionally, be provided and/or stored on non-transitory tangible media, such as magnetic, optical, or electronic memory.

In some embodiments, different cells 28 in the cooperating group transmit downlink signals using respective different cell identifiers (cell IDs). Therefore, transmission parameters that are derived from the cell ID will also differ from cell to cell. One of the parameters derived from the cell ID is the pattern of REs, in time and frequency, used by the cell for transmitting Common Reference Signals (CRS).

Thus, in some embodiments, different cells 28 in the CoMP group transmit CRS in respective different patterns of REs. In such a scenario, the choice of REs that are available for transmitting PDSCH to the UEs is limited to the REs that do not belong to any of the CRS patterns of the cells.

Figure 2:
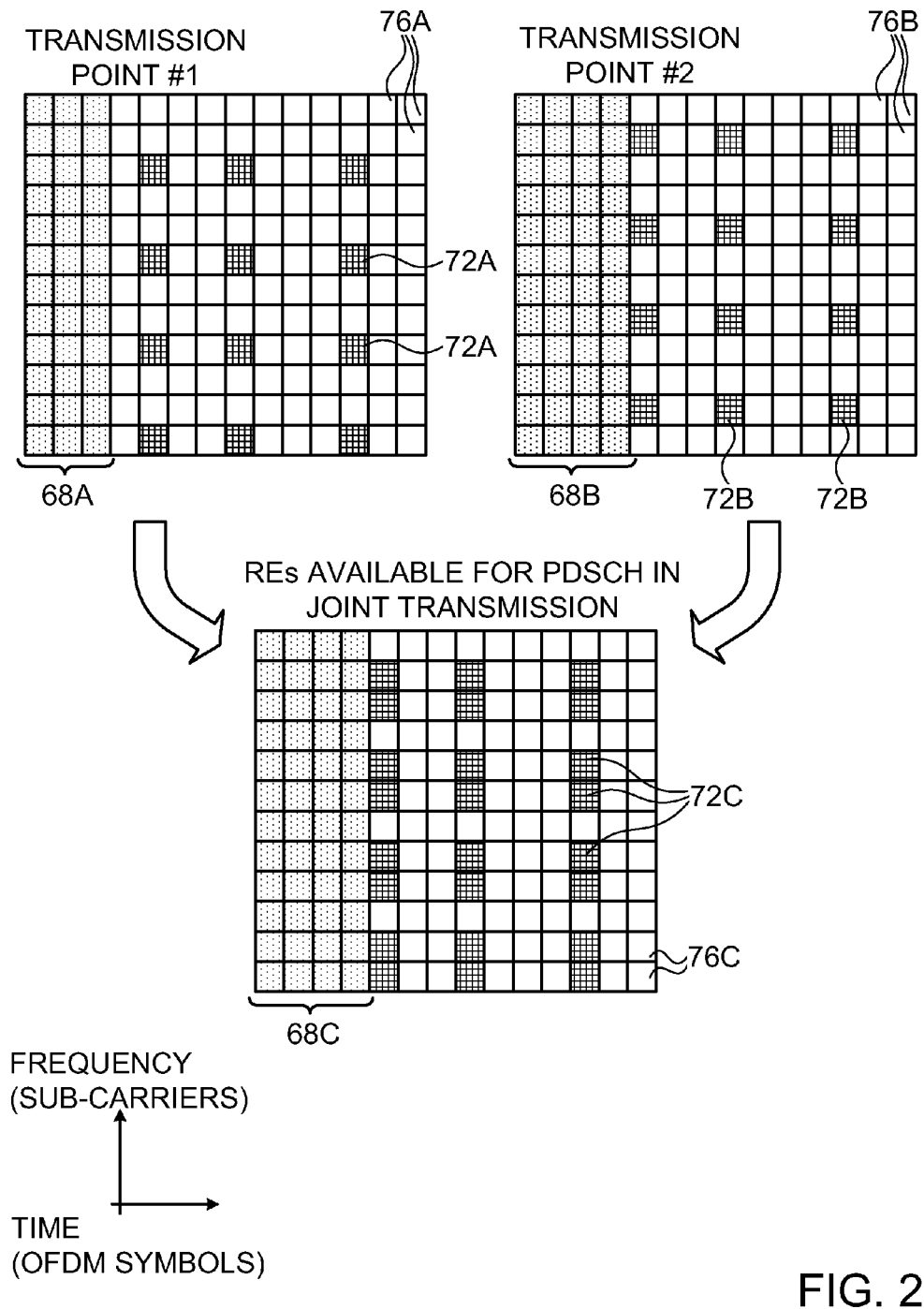
FIGS. 2 and 3 are diagrams showing allocations of time-frequency Resource Elements (REs) in a MIMO communication system that uses CoMP, in accordance with embodiments that are described herein.

FIG. 2 is a diagram showing allocations of time-frequency REs in system 20, in accordance with an embodiment that is described herein. In the present example, the CoMP group comprises two cells 28 (Transmission Points—TP), referred to as TP#1 and TP#2. Both cells transmit downlink signals using normal LTE-A sub-frames.

The diagram at the top-left of the figure shows the time-frequency RE allocation in the downlink signal transmitted by TP#1. The horizontal axis represents the time domain (OFDM symbols) and the vertical axis represents the frequency domain (OFDM sub-carriers). The same pattern is typically repeated periodically in time and frequency.

In the signal of TP#1, the first three OFDM symbols of each transmission Time Interval (TTI) are allocated for a Physical Downlink Control Channel (PDCCH) 68A. The PDCCH REs are dotted in the figure. A pattern of REs 72A (checkered in the figure) is used for transmitting Common Reference Signals (CRS). The remaining REs (clear in the figure) are available for transmitting PDSCH 76A.

(Note that Common Reference Signals (CRS) are typically also transmitted in the region of PDCCH 68A. FIG. 2 does not show CRS in 68A for the sake of clarity. CRS in the PDCCH region are typically not used in PDSCH extraction in accordance with the 3GPP specifications. The same simplification is also applied in the other diagrams in FIG. 2.)

The diagram at the top-right of the figure shows the time-frequency RE allocation in the downlink signal transmitted by TP#2, which is the present example has a different cell ID than TP#1. In the signal of TP#2, the first four OFDM symbols of each TTI are allocated for a PDCCH 68B, a pattern of REs 72B is used for transmitting CRS, and the remaining REs are available for transmitting PDSCH 76B.

As can be seen in the figure, TP#1 and TP#2 differ from one another in the number of symbols allocated to PDCCH (and therefore in the start time of the CRS pattern), as well as in the CRS pattern itself. It can also be seen that CRS patterns 76A and 76B of TP#1 and TP#2 can be viewed as a certain time-frequency shift of some baseline pattern. In other words, CRS patterns 76A and 76B can be produced by applying different time-frequency shifts to the same baseline pattern of CRS. In some embodiments, these properties are used for defining the signaling information that is transmitted to UE 24, as will be explained below.

The diagram at the bottom of the figure shows an overlay of the top-left and top-right diagrams. REs in OFDM symbols 68C are occupied by PDCCH in at least one of the TPs. REs 72C are occupied by CRS in at least one of the TPs. The remaining REs 76C (the clear REs in the diagram) are not occupied by PDCCH or CRS in any of the TPs, and are therefore available for PDSCH transmission. Scheduler 32 will thus typically schedule PDSCH transmissions in one or more of REs 76C.

In the present example, TP#1 serves as the anchor cell. In some embodiments, the anchor cell transmits to UE 24 signaling information, which is indicative of the CRS patterns of TP#1 and TP#2 (patterns 72A and 72B). Signaling extraction module 52 in processing circuitry 48 of UE 24 extracts the signaling information from the downlink signal of TP#1, and derives the locations of REs 76C that are available for PDSCH. Module 52 provides the locations of REs 76C to PDSCH module 56. In an embodiment, module 52 also derives the locations of REs 72A and 72B, i.e., the locations of the CRS REs per TP, and provides this information to measurement and feedback module 60.

The example of FIG. 2 refers to two TPs, one serving as an anchor cell and the other serving as a secondary cell. Generally, however, the disclosed techniques can be used with larger CoMP groups that comprise multiple secondary cells. In such embodiments, the anchor cell transmits to the UE signaling information that is indicative of the CRS patterns of the anchor cell and the multiple secondary cells.

In some embodiments, the signaling information further indicates the identities of various sets of cells 28 that are related to the CoMP scheme. The sets may comprise, for example, a Radio Resource Management (RRM) set of cells for which the UE is to perform RRM measurements (e.g., Reference Signal Received Power—RSRP), a Channel State Information (CSI) measurement set of cells for which the UE is to measure CSI, a CSI feedback set of cells for which the UE is to report CSI, and/or a transmission set of cells that transmit to the UE. In an embodiment, the signaling of the various CoMP sets is carried out in accordance with the following table:

TABLE 1

Example CoMP set signaling scheme

| CoMP set | Direction | Signaling method |
|---|---|---|
| RRM Measurement set | eNodeB to UE | Semi-static |
| CSI measurement set | eNodeB to UE | Semi-static |
| CSI reporting set | eNodeB to UE (or) UE to eNodeB | Semi-static/Dynamic |
| Transmission set | eNodeB to UE | Explicit dynamic signaling or implicit dynamic signaling of PDSCH mapping |

In an embodiment, the CoMP transmission set is transparent to the UE, in which case the transmission set is not signaled explicitly. In alternative embodiments, any other signaling scheme can be used for signaling the various CoMP sets. Dynamic signaling may be signaled, for example, using Downlink Control Information (DCI).

In other embodiments, the transmission set is signaled explicitly to the UE, for example using a bit-map in which "1" indicates that the respective TP belongs to the transmission set, and "0" indicates that the TP does not belong. For example, consider the group of four CSI-RS resources {1, 3, 4, 7}. The transmission set {1, 3} can be signaled to the UE using the bit-map [1 1 0 0]. CSI-RS resources that do not belong to the transmission set are nevertheless included in the bit-map, so that the UE is able to derive the PDSCH resource mapping correctly.

In various embodiments, the signaling information may be formatted using different formats. In an example embodiment, the signaling information indicates, per TP, the number of CRS ports, the time-frequency shift of the CRS pattern of each CRS port relative to some baseline pattern position, and the number of symbols allocated to PDCCH (and therefore in the start time of the CRS pattern.

In some embodiments, the signaling further indicates the type of downlink sub-frame used by each TP. A given TP, for example, may use Multimedia Broadcast Single Frequency Network (MBSFN) sub-frames in which the first two OFDM symbols are allocated to PDCCH, and CRSs are not transmitted at all. If all TPs transmit using MBSFN, sub-frames overhead is reduced and all REs other than the first two OFDM symbols are available for PDSCH. In an embodiment, the signaling information indicates the MBSFN configuration (e.g., whether or not MBSFN is used) per TP.

In some embodiments, the various parameters listed above are signaled explicitly. In an example embodiment, each parameter is separately assigned a certain number of bits in the signaling information. In another example embodiment, the possible combinations of parameters are enumerated in advance in a manner that is agreed upon between the UEs and the cells. The signaling information in this embodiment comprises an index that indicates the applicable combination of parameters. This scheme is more efficient in terms of signaling overhead.

In other embodiments, the PDCCH length is signaled explicitly and the other parameters are tied a-priori to the Channel State Information Reference Signal (CSI-RS) configuration. In the latter embodiment, the signaling information indicates the PDCCH length and the CSI-RS configuration, and the UE determines the other parameters (e.g., CRS pattern shift) from the CSI-RS configuration. In emerging versions of the LTE-A specification, the PDSCH RE mapping is represented jointly with quasi-co-location information in a single field denoted "PDSCH RE Mapping and Quasi-Co-Location Indicator" (PQI). In the present context, PQI is also considered signaling information that is indicative of the pattern of REs used by a cell.

In some embodiments, the use of a certain CoMP mode (e.g., JT or DPS) is restricted to certain sub-frame configurations of the different cells in the cooperating group. In these embodiments, processing circuitry 48 applies a certain CoMP mode only when the sub-frame configurations of the various cells are suitable for that mode.

Consider, for example, the JT CoMP mode (also referred to as Joint Processing—JP) in which multiple cells transmit the same data to the UE simultaneously. The REs to be used for JT should be clear of PDCCH and CRS in all the configurations of all the cooperating cells. Thus, in an example embodiment, the cells and the UE use JT only in MBSFN sub-frames (which do not contain CRS at all and in which it is known that the first two OFDM symbols are assigned for PDCCH).

In another example embodiment, the cells and the UE use JT only when the anchor cell and secondary cells have the same number of PDCCH symbols (same PDCCH length). In yet another embodiment, the cells and the UE use JT only when the PDCCH length of the secondary cells does not exceed the PDCCH length of the anchor cell. In these embodiments, the REs occupied by CRS are skipped by all the cooperating cells when transmitting PDSCH using JT. In these embodiments, the transmission set is typically signaled explicitly.

As another example, consider the DPS CoMP mode in which only a single dynamically-selected cell transmits downlink signals to the UE at any given time. DPS is less sensitive to CRS pattern mismatch and PDCCH length mismatch than JT. Nevertheless, the mapping and starting position of the PDSCH is not known to the UE. The PDSCH starting position is given by $\max(c_s,c_d)$, wherein $c_s$ and $c_d$ denote the PDSCH starting positions of the anchor cell and of the dynamically-selected transmitting cell, respectively.

In an example embodiment, for DPS, the signaling information jointly encodes the CRS pattern time-frequency shift and the PDCCH length. The control information is transmitted by the anchor cell, the PDSCH is scheduled dynamically, and the Radio Resource Control (RRC) layer is configured to inform the UE of the PDSCH scheduling. In an embodiment, the control information is transmitted by the anchor cell, and the signaling information provides explicit indication of the cell ID. The UE is thus able to derive the PDCCH length and CRS pattern shift from the signaling information.

Figure 3:
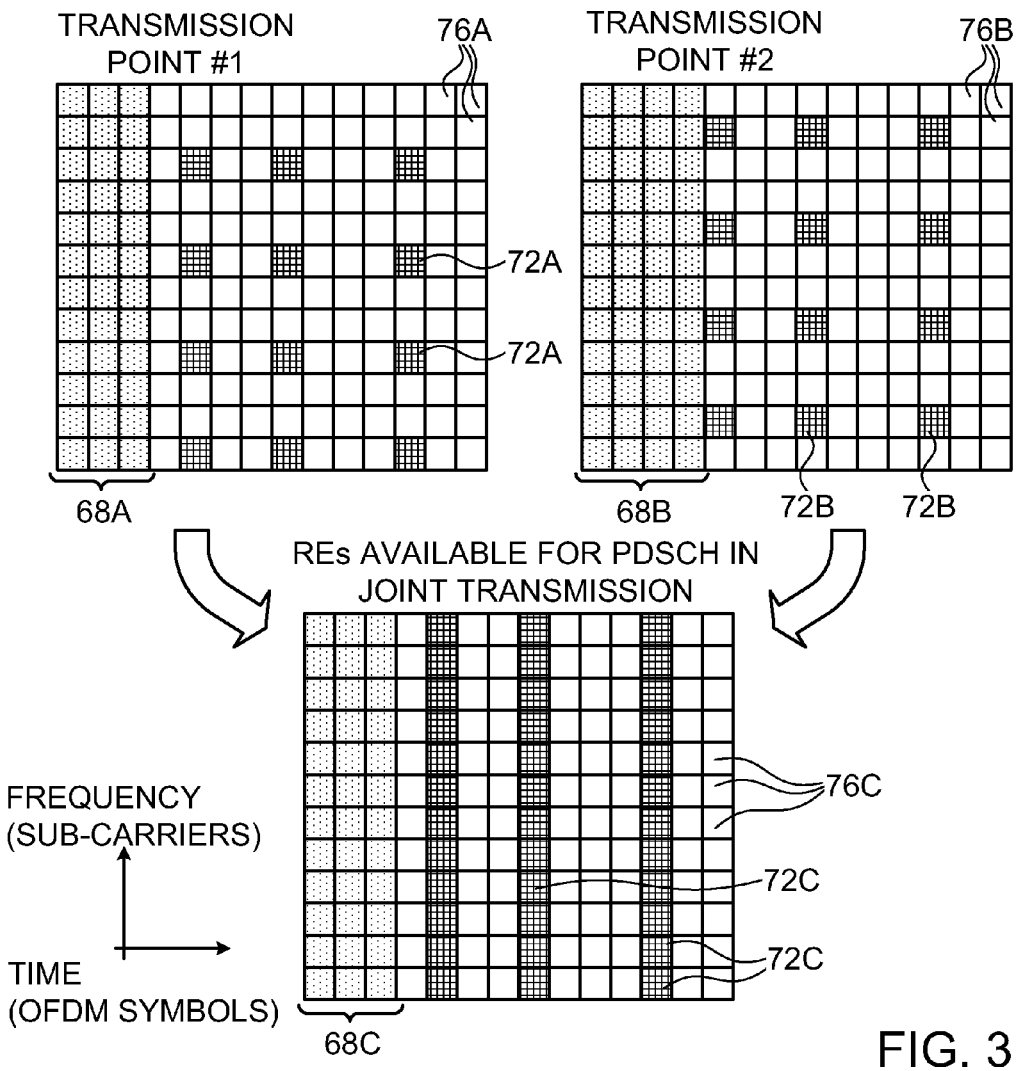

FIG. 3 is a diagram showing allocations of time-frequency REs in system 20, in accordance with another embodiment that is described herein. In this example, TP#1 and TP#2 transmit normal sub-frames, and the sub-frame configurations of TP#1 and TP#2 are the same as in the example of FIG. 2 above. In the example of FIG. 3, however, the UE skips an OFDM symbol entirely if that OFDM symbol comprises a CRS of any of the TPs. Therefore, as can be seen in the diagram at the bottom of the figure, the UE regards the entire fifth, eighth and twelfth OFDM symbols as not available for receiving data.

Generally, the signaling information may comprise a rate matching indicator that is indicative of the REs that are to be skipped by the UEs when identifying REs that are available for PDSCH. The rate matching indicator may be defined using zero-power CSI-RS, which are configured jointly for multiple TPs and are not UE-specific.

In other embodiments, the anchor cell transmits normal sub-frames and the secondary cells transmit MBSFN sub-frames. The actual sub-frame configuration (e.g., PDCCH length and CRS pattern shift) of the anchor cell is signaled to the UE. This sort of configuration incurs small signaling overhead and no CRS pattern mismatch.

In yet another embodiment, TP#1 and TP#2 transmit using non-coherent JT. In this mode, the two TPs transmit independent data streams to the same UE simultaneously. The port allocation for Demodulation Reference Signals (DMRS) ensures that the two streams are assigned orthogonal ports. In this embodiment, Downlink Control Information (DCI) allocation rank-2 is used, and the same PDSCH scrambling is applied to both streams.

Figure 4:
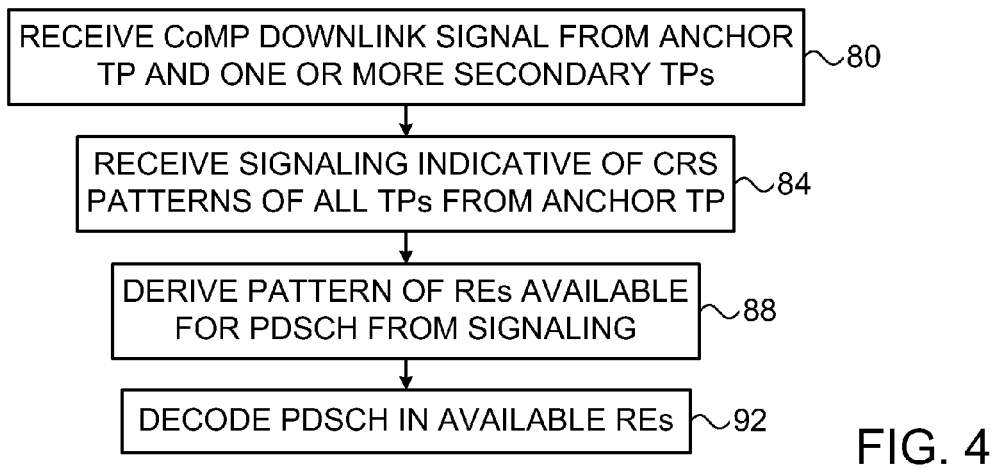
FIG. 4 is a flow chart that schematically illustrates a method for downlink reception in a mobile communication terminal, in accordance with an embodiment that is described herein.

FIG. 4 is a flow chart that schematically illustrates a method for downlink reception in terminal 24, in accordance with an embodiment that is described herein. The method begins with DL RX 40 of terminal 24 receiving a CoMP downlink signal from an anchor cell and one or more secondary cells, at a reception operation 80. As part of the downlink signal, DL RX 40 receives signaling information from the anchor cell, at a signaling reception operation 84. The signaling information is indicative of the CRS patterns used by the anchor cell and the secondary cell or cells. The signaling information is provided to signaling extraction module 52 in processing circuitry 48 of terminal 24.

Module 52 uses the signaling information to derive the pattern of REs that are available for PDSCH, at a PDSCH RE identification operation 88. PDSCH module 56 decodes the PDSCH in one or more of the REs derived by module 52, at a decoding operation 92.

Although the embodiments described herein mainly address 3GPP LTE/LTE-A, the methods and systems described herein can also be used in other applications, such as in IEEE 802.11/Wi-Fi, IEEE 802.16/WiMAX, and any other distributed antenna system (DAS).

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a mobile communication terminal, receiving signals from a group of cells that cooperate in a Coordinated Multipoint (CoMP) transmission scheme;
   receiving, from a first cell in the group, signaling information which is indicative of a first pattern of time-frequency Resource Elements (REs) used by the first cell for transmitting reference signals, and is further indicative of a second pattern of the REs used by a second cell in the group for transmitting the reference signals;
   deriving in the terminal from the signaling information, which is indicative of the first and second patterns, a third pattern of the REs that are available for receiving data from the cells, including omitting from the third pattern at least one RE that the signaling information indicates should be skipped; and
   receiving in the terminal the data from the cells in one or more of the REs in the third pattern.

2. The method according to claim 1, wherein receiving the signaling information comprises receiving an indication of a time-frequency shift of the second pattern, and wherein deriving the third pattern comprises determining the third pattern based on the shift.

3. The method according to claim 1, wherein receiving the signaling information comprises receiving an indication of a number of symbols used by the second cell for transmitting a control channel prior to the second pattern, and wherein deriving the third pattern comprises determining the third pattern based on the indication.

4. The method according to claim 1, wherein receiving the signaling information comprises receiving a list of the cells in the group, or a measurement list of the cells in a measurement group over which the terminal is to perform signal measurements.

5. The method according to claim 1, wherein deriving the third pattern comprises including in the third pattern only the REs that do not belong to any of the first and second patterns.

6. The method according to claim 1, wherein deriving the third pattern comprises selecting, based on the signaling information, a subset of the REs in which to receive the data from the cells in a given CoMP mode.

7. The method according to claim 1, wherein receiving the signaling information comprises receiving one or more of a dynamic signaling and a semi-static signaling.

8. A method, comprising:
   in a mobile communication terminal, receiving signals from a group of cells that cooperate in a Coordinated Multipoint (CoMP) transmission scheme;
   receiving, from a first cell in the group, signaling information which is indicative of a first pattern of time-frequency Resource Elements (REs) used by the first cell for transmitting reference signals, and is further indicative of a second pattern of the REs used by a second cell in the group for transmitting the reference signals, including receiving an index that enumerates multiple possible combinations of the first and second patterns;
   based on the index, deriving in the terminal from the signaling information, which is indicative of the first and second patterns, a third pattern of the REs that are available for receiving data from the cells; and
   receiving in the terminal the data from the cells in one or more of the REs in the third pattern.

9. A method, comprising:
   in a mobile communication terminal, receiving signals from a group of cells that cooperate in a Coordinated Multipoint (CoMP) transmission scheme;
   receiving, from a first cell in the group, signaling information which is indicative of a first pattern of time-frequency Resource Elements (REs) used by the first cell for transmitting reference signals, and is further indicative of a second pattern of the REs used by a second cell in the group for transmitting the reference signals;
   deriving in the terminal from the signaling information, which is indicative of the first and second patterns, a third pattern of the REs that are available for receiving data from the cells, including omitting from the third pattern the REs of a given symbol upon detecting that the first cell or the second cell transmit one or more of the reference signals in the given symbol; and
   receiving in the terminal the data from the cells in one or more of the REs in the third pattern.

10. A communication apparatus, comprising:
    a transceiver, which is configured to receive signals from a group of cells that cooperate in a Coordinated Multipoint (CoMP) transmission scheme, and to receive, from a first cell in the group, signaling information which is indicative of a first pattern of time-frequency Resource Elements (REs) used by the first cell for transmitting reference signals, and is further indicative of a second pattern of the REs used by a second cell in the group for transmitting the reference signals; and a processor, which is configured to derive from the signaling information that is indicative of the first and second patterns, signaled by the first cell, a third pattern of the REs that are available for receiving in the transceiver data from the cells, and to control the transceiver to receive the data from the cells over one or more of the REs in the third pattern, wherein the transceiver is configured to receive in the signaling information an indication of at least one RE that is to be skipped in derivation of the third pattern, and wherein the processor is configured to omit the at least one RE from the third pattern.

11. The apparatus according to claim 10, wherein the transceiver is configured to receive in the signaling information an indication of a time-frequency shift of the second pattern, and wherein the processor is configured to derive the third pattern based on the shift.

12. The apparatus according to claim 10, wherein the transceiver is configured to receive in the signaling information an indication of a number of symbols used by the second cell for transmitting a control channel prior to the second pattern, and wherein the processor is configured to derive the third pattern based on the indication.

13. The apparatus according to claim 10, wherein the transceiver is configured to receive in the signaling information a list of the cells in the group, or a measurement list of the cells in a measurement group over which the terminal is to perform signal measurements.

14. The apparatus according to claim 10, wherein the processor is configured to include in the third pattern only the REs that do not belong to any of the first and second patterns.

15. The apparatus according to claim 10, wherein the processor is configured to select, based on the signaling information, a subset of the REs in which to receive the data from the cells in a given CoMP mode.

16. The apparatus according to claim 10, wherein the transceiver is configured to receive the signaling information in one or more of a dynamic signaling and a semi-static signaling.

17. A mobile communication terminal comprising the communication apparatus of claim 10.

18. A chipset for processing signals in a mobile communication terminal, comprising the communication apparatus of claim 10.

19. A communication apparatus, comprising:

a transceiver, which is configured to receive signals from a group of cells that cooperate in a Coordinated Multipoint (CoMP) transmission scheme, and to receive, from a first cell in the group, signaling information which is indicative of a first pattern of time-frequency Resource Elements (REs) used by the first cell for transmitting reference signals, and is further indicative of a second pattern of the REs used by a second cell in the group for transmitting the reference signals, wherein the signaling information comprises an index that enumerates multiple possible combinations of the first and second patterns; and a processor, which is configured to derive, based on the index, from the signaling information that is indicative of the first and second patterns, signaled by the first cell, a third pattern of the REs that are available for receiving in the transceiver data from the cells, and to control the transceiver to receive the data from the cells over one or more of the REs in the third pattern.

20. A communication apparatus, comprising:

a transceiver, which is configured to receive signals from a group of cells that cooperate in a Coordinated Multipoint (CoMP) transmission scheme, and to receive, from a first cell in the group, signaling information which is indicative of a first pattern of time-frequency Resource Elements (REs) used by the first cell for transmitting reference signals, and is further indicative of a second pattern of the REs used by a second cell in the group for transmitting the reference signals, wherein the signaling information comprises; and a processor, which is configured to derive from the signaling information that is indicative of the first and second patterns, signaled by the first cell, a third pattern of the REs that are available for receiving in the transceiver data from the cells, to omit from the third pattern the REs of a given symbol upon detecting that the first cell or the second cell transmit one or more of the reference signals in the given symbol, and to control the transceiver to receive the data from the cells over one or more of the REs in the third pattern.

* * * * *